March 21, 1950 W. J. O'BRIEN 2,501,233

PHONOGRAPH PICKUP HAVING PERMANENT MAGNET ARMATURE

Filed March 19, 1946 2 Sheets-Sheet 1

INVENTOR
WILLIAM JOSEPH O'BRIEN
BY
Harold E. Mattingly
ATTORNEY

March 21, 1950 W. J. O'BRIEN 2,501,233

PHONOGRAPH PICKUP HAVING PERMANENT MAGNET ARMATURE

Filed March 19, 1946 2 Sheets-Sheet 2

INVENTOR
WILLIAM JOSEPH O'BRIEN
BY Harold W. Mattingly
ATTORNEY

Patented Mar. 21, 1950 2,501,233

UNITED STATES PATENT OFFICE 2,501,233

PHONOGRAPH PICKUP HAVING PERMANENT MAGNET ARMATURE

William Joseph O'Brien, London, England, assignor to The Decca Record Company Limited, London, England a British company Application March 19, 1946, Serial No. 655,441
In Great Britain March 14, 1945

Section 1, Public Law 690, August 8, 1946
Patent expires March 14, 1965

4 Claims. (Cl. 179—100.41)

My invention relates to an electromagnetic phonograph reproducer or pick-up and has particular reference to a pick-up of the dynamic type which finds particular utility when employed for the reproduction of high fidelity recordings embracing a wide frequency range.

Prior to my invention dynamic pick-ups of the moving coil type have been employed in an attempt to faithfully and accurately translate into electrical potentials the sound frequencies recorded on phonograph records. These attempts have not been entirely successful because of the difficulty of keeping the weight of the moving coil sufficiently small to eliminate the inertia effects, and for the further reason that stray alternating magnetic fields, as from the electronic amplifier equipment or the electric motor used to drive the record turntable, induce in the pick-up coil alternating potentials which distort the frequencies translated from the record and add to the reproduction a hum component. Furthermore the prior pick-ups were heavy, complicated, and costly to produce.

The present invention is directed to a dynamic type of phonograph pick-up which differs from conventional construction in that the pick-up coil is held stationary and made a part of the permanent fixed equipment whereas a small strong permanent magnet is employed as the moving element. By so arranging the parts and incorporating novel features of design and construction I am enabled to retain all of the advantages of the dynamic type of pick-up while at the same time securing the further advantages of eliminating undesirable hum components which might otherwise be induced in the pick-up coils. I am able to obtain a higher output level than is possible in prior constructions, and I am able to obtain a more faithful reproduction of the recorded material by reducing the weight of the moving elements and making the moving elements with a higher intrinsic strength and rigidity to thereby avoid the distortions encountered in the moving coil type of pick-ups and resulting from the flexing, deformation or partial break up of the moving coil.

It is therefore an object of my invention to provide an electromagnetic pick-up for the reproduction of phonograph recordings in which the pick-up coils are formed as a part of the fixed stationary equipment, and in which the moving element comprises a small light weight and very strong permanent magnet.

It is an additional object of my invention to provide a pick-up of the character described in the preceding paragraph in which the coils are so arranged that any stray alternating potentials induced in the coils will be cancelled out so as to prevent reproduction of such unwanted signals.

It is also an object of my invention to provide a pick-up of the character set forth in the preceding paragraphs in which a novel trunnion construction is employed for mounting the magnet for oscillatory motion to produce a relative motion between the magnetic field flux and the pick-up in response to vibrations of the pick-up stylus produced by the record.

It is an additional object of my invention to provide a structure of the character set forth in the preceding paragraphs in which an auxiliary stationary permanent magnet is used to augment and control the varying field flux produced by the moving magnet to thereby produce a high level output free from distortion.

It is also an object of my invention to provide a structure of the character set forth in the preceding paragraphs which is extremely light in weight and of simple construction permitting low cost manufacture.

Other objects and advantages of my invention will be apparent from a study of the following specification read in connection with the accompanying drawings, wherein.

Referring to the embodiment of the invention shown in Figures 1 to 5 the pick-up assembly includes a main frame 1 which is preferably formed of light weight insulating material such as a suitable synthetic resin of the phenolic or equivalent type. The frame 1 includes a rearwardly extending cylindrical boss 2 terminating in a radially extending flange portion 3. The boss 2 is intended for introduction into the bore of a tubular tone arm or equivalent support for supporting the pick-up during its traversal of the record.

Forward of the flange portion 3 the diameter of the body of the main frame 1 is reduced as indicated at 4 to provide a relatively short cylindrical section over which a light metal or plastic cover 5 may be placed and held by a spring gripping action afforded by slitting the cover longitudinally at intervals about its circumference as indicated at 6.

Figure 1:
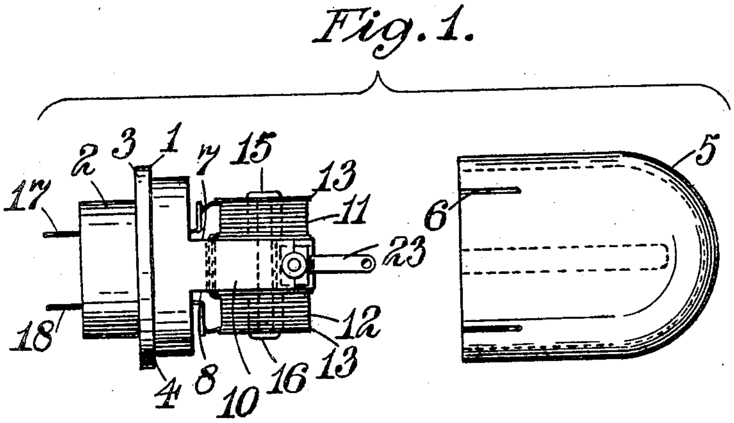
Figure 1 is a top plan view of a phonograph pick-up constructed in accordance with one embodiment of my invention showing the enclosing cover removed to reveal the details of interior construction.

The sides of the body 1 are cut away as indicated at 7 and 8 (Figures 1 and 5) to provide a forwardly extending web 10 on opposite sides of which a pair of pick-up coils 11 and 12 are mounted. The coils 11 and 12 may be wound upon light weight spools or coil supports 13 formed of thin insulating material and they may be held in place as shown in Figures 1 and 3 as by means of a transversely extending rivet 14 formed of non-magnetic material and having heads at 15 and 16 to engage the outer faces of the coil supports 13.

Figure 3:
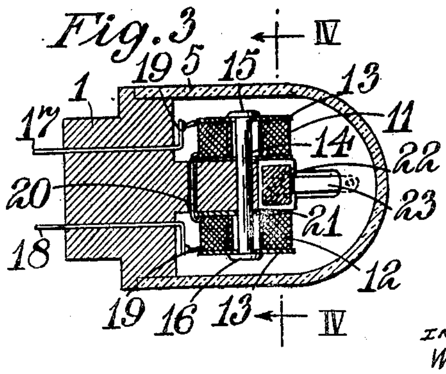
Figure 3 is a longitudinal sectional view taken substantially along the line III—III of Figure 2 and showing the details of the coil mounting and the operative relationship between the coils and the moving magnet.

Electrical connections to the coils are afforded by means of two metal pins or wires 17 and 18 extended longitudinally through the body 1 as shown in Figure 3. These pins may be turned outwardly as shown to permit attaching the coil leads to the pins in a suitable manner as by soldering indicated at 19. The two coils may be interconnected by wires passing through a small drilled hole 20 extending transversely through the web 10.

Figure 5:
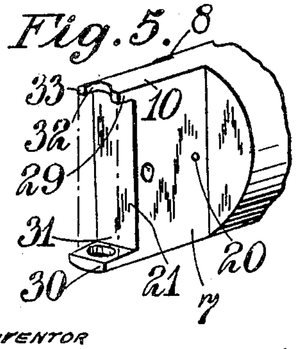
Figure 5 is a fragmentary perspective view with parts broken away and other parts removed to show construction of that portion of the main frame which serves as the mounting means for engaging the trunnions on the moving magnet.

As is best shown in Figure 5 the web 10 terminates in a vertical face 21 just beyond the rivet 14 to leave a clear space between the forward edges of each of the coils 11 and 12. Within this space there is mounted a moving permanent magnet 22. The permanent magnet 22 is preferably formed as a rectangular bar extending vertically in front of the face 21 and normally parallel thereto. This places the magnet in a channel formed by the forward sides of the coils 11 and 12 and the front face 21. With this arrangement one side of each coil is influenced by the magnetic field either to the exclusion of the other side or to a greater extent than the other side.

As will appear herinafter the magnet 22 is mounted for oscillatory movement about a vertical axis and is traversely magnetised so that oscillatory movement of the magnet will swing a magnetic flux past the conductors of the coils 11 and 12 so as to induce therein alternating potentials representative of the oscillatory motion of the magnet. The magnet 22 is preferably formed of a light weight permanent magnet material comprising a finely divided metal bonded by compression or sintering or suspended within a rigid bonding material such as a suitable synthetic resin. It is found that with such a material very high field strengths can be obtained with extremely low weight.

To the forward face of the magnet 22, i. e. the face directed away from the coils, there is attached a forwardly and slightly downwardly extending spring 23 to the outer end of which is secured by any suitable means a record engaging stylus 24 which by preference is formed of sapphire or similar jewel. The spring 23 comprises a thin flat member to present great rigidity in a lateral direction and considerable flexibility in the vertical direction so that the stylus 24 may rise and fall in case it is used on a record which is not quite flat. The lateral stiffness of the spring 23 forces the magnet 22 to oscillate in accordance with the lateral movements of the stylus 24 and imparted thereto by the wavy sides of the record grooves.

Figures 2, 4:
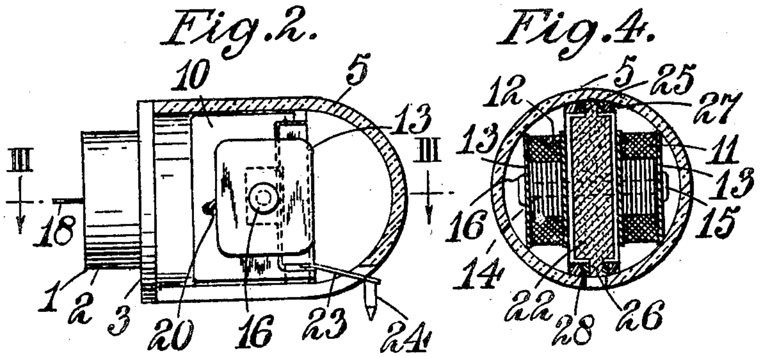
Figure 2 is a side elevational view of the pick-up shown in Figure 1.
Figure 4 is a cross sectional view taken substantially along the line IV—IV of Figure 3 and illustrating the manner in which the moving magnet is mounted for oscillatory movement.

Pivotal movement of the magnet 22 as described is provided for by forming integrally with the magnet longitudinally extending trunnion members 25 and 26 (Figure 4). Over these trunnions are placed sleeves 27 and 28 formed of rubber or like resilient material having great elasticity and a low modulus of rigidity. As is shown in Figure 5 the flat forward face 21 of the web 10 terminates short of the outer surfaces of the body 1 to leave two forwardly extending lugs 29 and 30 between which the magnet 22 extends. The arm 30 is bored as indicated at 31 to receive the lower rubber bushing 28. The upper arm 29 is similarly bored as shown at 32 but is cut transversely on a plane 33 passing through the center of the bore 32. This permits the magnet 22 to be readily installed by first placing the bushings 27 and 28 on the trunnions 25 and 26 and then slipping the trunnion 26 and bushing 28 into the bore 31. This will allow the upper end of the magnet 22 to clear the underside of the upper arm 29 so that the upper end of the magnet 22 may be moved rearwardly to seat the upper trunnion 25 and bushing 27 in the semicircular bore portion 32. The upward force exerted on the stylus 24 and transmitted through the spring 23 serves to hold the upper end of the magnet 22 back, and maintain engagement between the bushing 27 and the bore portion 32.

Attention is directed to the fact that when the magnet 22 is pivotly moved the direction of the lateral motion between the magnetic field flux and the forward side of the coil 11 is in a direction opposite to the relative movement of the flux with respect to the forward side of the coil 12. Thus, by connecting the two coils 11 and 12 in series with the polarities so arranged as to add the voltages induced in each coil by movement of the magnet 22 the coils are connected in a bucking or cancelling relation as regards voltages induced by stray extraneous fields so that these voltages are completely cancelled out. Thus alternating stray magnetic fields such as are produced by the driving motor for the record turntable produce no hum component in the signal developed by the pick-up.

In Figures 6 through 11 there is illustrated a modified form of the invention comprising a body member indicated generally at 50 which includes a rearwardly extending cylindrical boss 51 for attachment to the tone arm or pick-up support, the boss 51 terminating in a flange 52. Forward of the flange 52 the diameter of the body 50 is reduced as indicated at 53 to accommodate a slip-on cover of the character previously described and illustrated in Figure 1.

Forward of the reduced diameter portion 53 the body member 50 is cut away on both sides and on the top to provide a forwardly extending web member 54. As is shown in Figure 10 a rectangular recess 55 is cut in the web 54 from the forward end thereof to define a space within which a permanent magnet 56 of the type hereinbefore described is mounted for oscillatory movement about the vertical axis.

As in the previously described modification the magnet 56 includes integrally formed upper and lower trunnions 57 and 58 which are surrounded respectively by sleeves 59 and 60 formed of rubber or other like resilient material. These sleeves are received within transverse slots 61 and 62 cut in the inner surface of arm portions 63 and 64 defined by the recess or channel 55. This permits the magnet with the rubber bushings placed on the trunnions to be slid into position from the side, with the bushings located in the grooves 61 and 62.

The bushings are confined within the grooves by means of thin C-shaped spacer members 66 and 67 which comprise central vertically rising body sections 68 having formed integrally therewith forwardly extending upper and lower arms 69 and 70 positioned to extend respectively along either side of the arms 63 and 64 to cover the otherwise open ends of the grooves 61 and 62. The spacer members 66 and 67 are clamped between the web portion 54 and a pair of L-shaped pole pieces 71 and 72 by means of a pair of non-magnetic rivets or screws 73 and 74 passed laterally through the pole pieces, spacer and web 54.

Figures 6, 7, 8, 9, 10, 11:
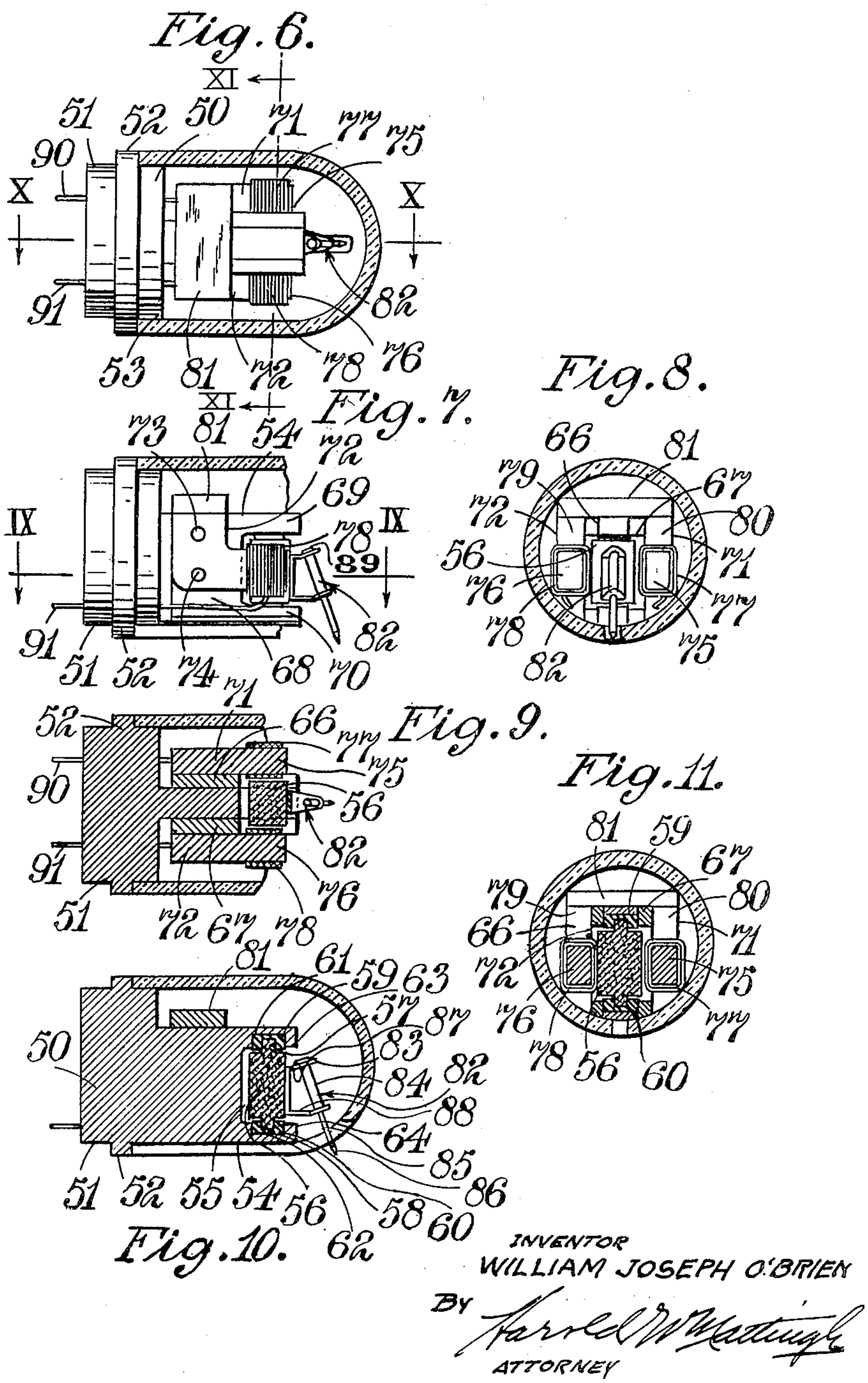
Figure 6 is a top plan view of a second embodiment of the invention with the outer cover removed and showing the interior arrangements of parts.
Figure 7 is a side elevational view of the structure shown in Figure 6.
Figure 8 is an end elevational view of the device shown in Figures 6 and 7.
Figure 9 is a horizontal sectional view taken substantially along the line IX—IX of Figure 7.
Figure 10 is a vertical sectional view taken substantially along the line X—X of Figure 6.
Figure 11 is a cross sectional view taken substantially along the line XI—XI of Figure 6.

The pole pieces 71 and 72 include forwardly extending arm portions 75 and 76 around which small pick-up coils 77 and 78 are wound as illustrated in Figures 9 and 11. The coils 77 and 78 are located as shown in Figure 9 to be directly aligned with the moving magnet 56. The magnet 56 is transversely magnetised to present a face of one polarity adjacent to the coil 77 and a face of the opposite polarity adjacent to the coil 78.

The pole pieces 71 and 72 include upwardly extending legs 79 and 80 which are spanned by a horizontally disposed and transversely extending shunt 81. This completes the external magnetic circuit between pole pieces 75 and 76. It is found that though a shunt 81 formed of a magnetic material such as soft iron may be successfully employed, improved results are obtained if the shunt 81 itself comprises a permanent magnet. The flux produced thereby across the air gaps between the pole pieces 75 and 76 and the permanent magnet 56 tends to reduce the leakage flux and produce a much greater flux variation in the coils as a result of an oscillatory movement imparted to the magnet, thus materially increasing the output level of the pick-up.

Oscillatory movement may be imparted to the magnet 56 by means of a reproducing stylus indicated generally at 82 which is removably supported within a stylus holder indicated generally at 83 and secured by suitable means to the forward face of the moving magnet 56. The stylus holder 83 is intended particularly for use with styli of the character illustrated in Figure 10 as comprising a relatively large diameter upper shank portion 84 integral with a reduced diameter extension 85 terminating in a record groove engaging point 86. The holder 83 comprises two forwardly extending spring arms 87 and 88 which are spaced from each other and disposed in vertical alignment. The lower arm 88 is provided with a bore of a diameter sufficient to pass the reduced diameter shank 85 but to refuse the larger diameter portion 84. The upper arm 87 is formed with a shallow pocket or recess 89 of circular form for receiving the upper end of the large diameter portion 84 of the stylus. The space separation of the arms 87 and 88 is normally less than the distance from the upper end of the stylus 87 to the junction of the large diameter portion 84 with the small diameter portion 85, so that when the stylus is placed in the position shown in Figure 10 the spring resilience of the arms 87 and 88 serves to firmly clamp the stylus between the upper end and the lower shoulder.

As in the previously described embodiment of the invention, electrical connection to the coils 77 and 78 may be afforded by small diameter metal pins 90 and 91 passed longitudinally through the body 50. The coils 77 and 78 are interconnected in such a way as to add the voltages induced in each by the oscillatory movements of the magnets 56. As before, the proper additive relation of the coils 77 and 78 is such as to produce a bucking or cancelling action of the coils with respect to external alternating fields, thus preventing a hum component being introduced into the output signal from stray fields such as are produced by the driving motor for the record turntable.

In the foregoing there are disclosed two forms of electromagnetic phonograph pick-up of the dynamic type each differing from conventional constructions in that the coils are made a part of the stationary fixed apparatus whereas a magnet comprises the moving element. With recently developed light weight magnetic materials it is possible to reduce the weight of the moving assembly by a considerable factor over that of the previous moving coil construction. Furthermore, such a moving assembly has high intrinsic strength and rigidity and is, therefore, not subject to failure as a result of prolonged vibrations and does not suffer the distortion and partial deformation which a relatively weak and flexible coil structure undergoes. As a result, the device operates to translate into alternating potentials with greatly improved accuracy the sound signals represented by the record sound track.

Attention is again directed to the fact that in both embodiments of the invention illustrated and described herein the fixed pick-up coils are so arranged with respect to the remainder of the magnetic circuit as to permit the signal voltages to be added in the two coils while undesirable voltages induced by stray extraneous magnetic fields are cancelled out.

I claim:

1. In a dynamic phonograph reproducer, the combination of: a main frame; a pair of pick-up coils; means mounting said coils on opposite sides of said frame in axially aligned positions; a permanent magnet; means mounting said magnet on said main frame between said coils for oscillatory movement relative thereto about a position normally disposing the poles of said magnet adjacent the edges of said coils with the magnetic axis of said magnet parallel to and spaced from the axis of said coils; means electrically interconnecting said coils in a normally opposing relationship with respect to potentials generated in said coils by flux changes of equal magnitude and like direction to thereby cancel out potentials generated by stray alternating fields, whereby the potentials generated in said coils by oscillatory movement of said magnet are added; and a record engaging stylus mounted on said magnet.

2. In a dynamic phonograph reproduced, the combination of: a main frame, a pair of pick-up coils; means mounting said coils on opposite sides of said frame; a permanent magnet; means mounting said magnet on said main frame between said coils for oscillatory movement relative thereto about a position normally disposing the poles of said magnet adjacent the edges of said coils with the axis of said magnet out of alignment with the axes of said coils; means electrically interconnecting said coils in a normally opposing relationship with respect to potentials generated in said coils by flux changes of equal magnitude and like direction to thereby cancel out potentials generated by stray alternating fields, whereby the potentials generated in said coils by oscillatory movement of said magnet are added; and a record engaging stylus mounted on said magnet.

3. In a dynamic phonograph reproducer, the combination of: a main frame; a pair of pick-up coils; means mounting said coils on opposite sides of said frame; an external magnetic circuit joining said coils; a permanent magnet; means mounting said magnet on said main frame between said coils for oscillatory movement relative thereto about a position normally disposing the poles of said magnet adjacent the edges of said coils with the magnetic axis of said magnet substantially at right angles to the axes of said coils; means electrically interconnecting said coils in a normally opposing relationship with respect to potentials generated in said coils by flux changes of equal magnitude and like direction to thereby cancel out potentials generated by stray alternating fields, whereby the potentials generated in said coils by oscillatory movement of said magnet are added; and a record engaging stylus mounted on said magnet.

4. In a dynamic phonograph reproducer, the combination of: a main frame; a pair of pick-up coils; means mounting said coils on opposite sides of said frame; an external magnetic circuit joining said coils and including a permanent magnet; another permanent magnet; means mounting said other magnet on said main frame between said coils for oscillatory movement relative thereto about a position normally disposing the poles of said other magnet adjacent the edges of said coils with the magnetic axis of said magnet substantially at right angles to the axes of said coils; means electrically interconnecting said coils in a normally opposing relationship with respect to potentials generated in said coils by flux changes of equal magnitude and like direction to thereby cancel out potentials generated by stray alternating fields, whereby the potentials generated in said coils by oscillatory movement of said other magnet are added; and a record engaging stylus mounted on said other magnet.

WILLIAM JOSEPH O'BRIEN.

REFERENCES CITED

The following references are of record in the file of this patent:

UNITED STATES PATENTS

| Number | Name | Date |
|---|---|---|
| 1,804,961 | Thomas | May 12, 1931 |
| 2,092,884 | Kendall | Sept. 14, 1937 |
| 2,105,167 | Sinnett | Jan. 11, 1938 |
| 2,388,116 | Bruderlin | Oct. 30, 1945 |

FOREIGN PATENTS

| Number | Country | Date |
|---|---|---|
| 362,494 | Great Britain | Dec. 2, 1931 |
| 336,648 | Great Britain | Oct. 15, 1930 |
| 334,551 | Great Britain | Sept. 5, 1930 |